US010004250B2

(12) United States Patent
Ugolini

(10) Patent No.: US 10,004,250 B2
(45) Date of Patent: Jun. 26, 2018

(54) MACHINE WITH IMPROVED THERMAL EFFICIENCY FOR THE PRODUCTION AND DISPENSING OF CHILLED FOOD PRODUCTS

(71) Applicant: UGOLINI SPA, Milan (IT)

(72) Inventor: Marco Corrado Ugolini, Milan (IT)

(73) Assignee: UGOLINI SPA, Milan (IT)

( * ) Notice: Subject to any disclaimer, the term of this patent is extended or adjusted under 35 U.S.C. 154(b) by 0 days. days.

(21) Appl. No.: 15/225,882

(22) Filed: Aug. 2, 2016

(65) Prior Publication Data
US 2017/0035075 A1   Feb. 9, 2017

(30) Foreign Application Priority Data
Aug. 3, 2015   (IT) .................. 102015000041195

(51) Int. Cl.
*B67D 7/80*   (2010.01)
*A23G 9/28*   (2006.01)
(Continued)

(52) U.S. Cl.
CPC .............. *A23G 9/281* (2013.01); *A23G 9/045* (2013.01); *A23G 9/12* (2013.01); *A23G 9/22* (2013.01);
(Continued)

(58) Field of Classification Search
CPC .......... A23G 9/281; A23G 9/045; A23G 9/12; A23G 9/222; A23G 9/225; A23G 9/04; A23G 9/10; A23G 9/103; A23G 9/106
(Continued)

(56) References Cited

U.S. PATENT DOCUMENTS 1,533,865 A * 4/1925 Jones ................. A23G 9/06
  62/516
2,508,435 A * 5/1950 Tacchella ............ A23G 9/16
  62/125
(Continued)

FOREIGN PATENT DOCUMENTS

EP   2862451 A1   4/2015
EP   2680708 B1   1/2016
(Continued)

OTHER PUBLICATIONS

CAB SPA: "Cabrio and Cabrio Visual Granitore/Slush Machine," CAB News at Host Brochure, Jan. 1, 2003, pp. 1-4.
(Continued)

*Primary Examiner* — Jeremy W Carroll
(74) *Attorney, Agent, or Firm* — Fredrikson & Byron, P.A.

(57) ABSTRACT

A machine for the production and dispensing of chilled food products comprises a tank containing an evaporator which forms part of a refrigerating circuit of the machine and a motorized mixer which rotates coaxially with the evaporator, with evaporator and mixer which project inside the tank through a rear sealed opening thereof, the tank being moreover provided at the front with a tap for dispensing the product through a dispensing outlet arranged above a dispensing zone intended to house a container for receiving the product. A shell of the opening type is arranged so as to enclose at least partially the tank and form a covering for at least partial thermal insulation of the tank from the external environment.

15 Claims, 5 Drawing Sheets

(51) Int. Cl.
    *A23G 9/04*     (2006.01)
    *A23G 9/12*     (2006.01)
    *A23G 9/22*     (2006.01)
    *F25D 23/06*     (2006.01)
    *F25D 31/00*     (2006.01)

(52) U.S. Cl.
    CPC .............. *A23G 9/28* (2013.01); *F25D 23/065* (2013.01); *F25D 31/003* (2013.01); *F25D 2201/10* (2013.01)

(58) Field of Classification Search
    USPC ...................................... 222/146.6, 183, 131
    See application file for complete search history.

(56) References Cited

U.S. PATENT DOCUMENTS

| | | | | |
|---|---|---|---|---|
| 4,757,920 A | * | 7/1988 | Harootian, Jr. | B67D 1/0869 220/4.22 |
| 5,617,736 A | * | 4/1997 | Ito | B67D 1/0864 222/146.6 |
| 5,967,226 A | * | 10/1999 | Choi | A23G 9/281 165/63 |
| 6,058,721 A | * | 5/2000 | Midden | A23G 9/045 62/136 |
| 8,453,882 B2 | * | 6/2013 | Johnson | B67D 1/0864 222/146.6 |
| 2005/0199130 A1 | | 9/2005 | Palese et al. | |
| 2009/0139257 A1 | * | 6/2009 | Cocchi | A23G 9/045 62/342 |

FOREIGN PATENT DOCUMENTS

| | | |
|---|---|---|
| JP | 10286066 A | 10/1998 |
| WO | 2012004687 A1 | 1/2012 |
| WO | 2012119962 A1 | 9/2012 |
| WO | 2014091393 A1 | 6/2014 |

OTHER PUBLICATIONS

Search Report and Written Opinion for related Italian Application No. 102015000041195 (UB20152770), from which the instant application is based, 7 pgs.

\* cited by examiner

MACHINE WITH IMPROVED THERMAL EFFICIENCY FOR THE PRODUCTION AND DISPENSING OF CHILLED FOOD PRODUCTS

RELATED APPLICATIONS

This application claims priority to Italian application No. 102015000041195 (UB2015A002770), filed Aug. 3, 2015, the teachings of which are incorporated herein by reference.

DESCRIPTION

The present invention relates to a machine for the production and dispensing of chilled products, such as ice cream, granita, cold drinks, etc., of the type comprising a visible tank which contains an evaporator of a refrigerating circuit and a helical screw for mixing the product to be dispensed through a tap provided on the tank.

These types of machines have the problem that there is a relatively low degree of thermal insulation in the region of the tank, since the tank is arranged visibly and made of transparent plastic. Since the chilled product is separated from the external environment only by the thickness of the tank wall, heat penetrates through the ample surface of the tank and lowers the thermal efficiency of the machine. Moreover, in the event of temporary stoppage of the machine (for example due to a sudden power failure) the product tends to heat up rapidly, absorbing heat from the outside.

Double-wall tanks with an insulating cavity have been proposed in the prior art. See for example JPH10286066 or EP2680708.

The solutions proposed, however, have a number of problems and drawbacks. First of all, in the specific application, the manufacture of double-wall tanks is difficult and costly because of the complex form of the tanks for these types of machine.

Moreover, even the smallest leaks between the walls give rise to stagnant water with consequent hygiene-related problems, but perfect insulation of the cavity from the outside is always difficult owing to the complex form of the tanks and therefore the need to provide long and complex sealing joints between the inner wall and the outer wall.

Since the tanks must often be removed from the machine and washed under running water, the continuous handling and inevitable knocks suffered may result in the formation of cracks and play in the wall seals, in particular along the wall joints, with consequent infiltration of water which is impossible to remove completely.

For example, EP2680708 describes a double-wall tank with double outer walls which at the top, bottom and front are formed integrally with the internal tank. External side walls are instead mounted subsequently on the two sides of the tank and welded or glued to the edges of the outer walls which are formed integrally with the tank, so as to ensure the definitive and complete closure of the cavity. The manufacture of the tank, however, is relatively complex and costly on account of the moulding and gluing operations required. Moreover, the long seams provided along the edge of the side walls may be easily broken. Furthermore the materials of the inner and outer walls cannot be freely or separately chosen, said walls being partly formed integrally and partly having to be welded or glued together.

Since the tank must be made of transparent material, the welds and/or the bonds between the walls are usually visible and may result in an unsatisfactory results in terms of appearance, in particular if they are made thicker with a view to increasing their strength.

The general object of the present invention is to provide a machine of aforementioned type with a tank which has satisfactory thermal insulation properties in relation to the exterior, can be easily manufactured and suitably cleaned, is not affected by stagnation problems due to infiltrations and which, where required, allows a greater choice of materials.

In view of this object the idea which has occurred, according to the invention, is to provide a machine for the production and dispensing of chilled food products comprising a tank containing an evaporator which forms part of a refrigerating circuit of the machine and a motorized mixer which rotates coaxially with the evaporator, with evaporator and mixer which project inside the tank though a rear sealed opening thereof, the tank being moreover provided at the front with a tap for dispensing the product through a dispensing outlet arranged above a dispensing zone intended to house a container for receiving the product, characterized in that it comprises a shell of the opening type which encloses the tank at least partially and which forms a covering for at least partial thermal insulation of the tank from the external environment.

Also the idea which has occurred is to provide a thermal insulation shell intended to cover at least partially a tank of a machine for the production and dispensing of chilled food products, of the type comprising a tank containing an evaporator which forms part of a refrigerating circuit of the machine and a motorized mixer which rotates coaxially with the evaporator, with evaporator and mixer which project inside the tank though a rear sealed opening thereof, the tank being moreover provided at the front with a tap for dispensing the product through a dispensing outlet arranged above a dispensing zone intended to house a container for receiving the product, the shell being provided with opening and closing means so that it may be mounted on the tank.

In order to illustrate more clearly the innovative principles of the present invention and its advantages compared to the prior art, examples of embodiment applying these principles will be described below with the aid of the accompanying drawings. In the drawings.

Figure 1:
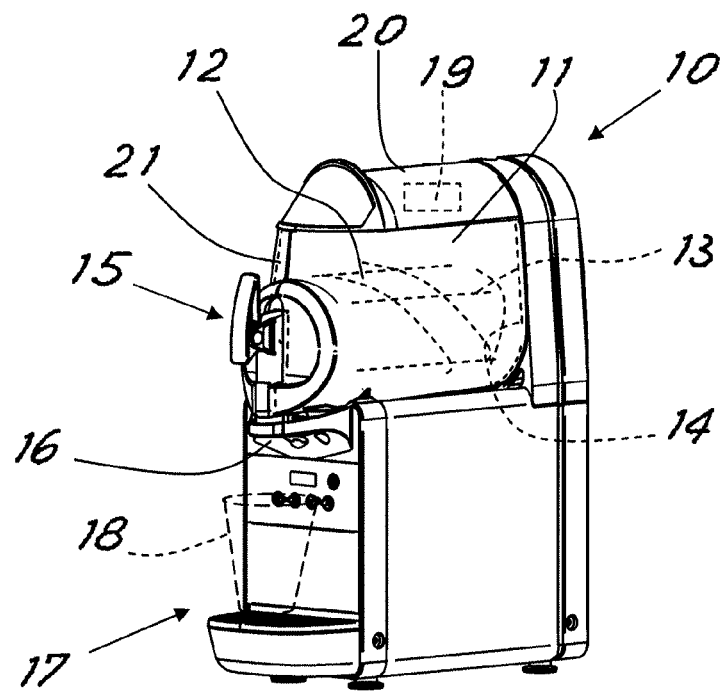
FIG. 1 shows a schematic perspective view of a machine for the production and dispensing of chilled food products applying the principles of the invention.

With reference to the figures, FIG. 1 shows a machine, denoted generally by 10, for the production and dispensing of chilled food products such as ice cream, granita, cold drinks and the like. The machine comprises a known tank 11 (generally made of transparent plastic) containing a cylindrical evaporator 12 which forms part of a refrigerating circuit of the machine and a motorized helical mixer 13 (inside and/or outside the cylinder 12) which rotates coaxially with the evaporator. Evaporator and mixer project inside the tank through a rear opening 14 formed therein.

The tank 11 also has at the front a tap 15 for dispensing the product through a dispensing outlet 16. The tap may be advantageously of the type with a control lever to be lowered or pressed in order to perform dispensing.

The dispensing outlet 16 is arranged above a zone 17 of the machine which is intended to receive a container 18 (for example an ice cream cone or wafer, a cup or similar container open at the top, etc.) which is placed by the operator underneath the dispensing outlet in order to receive a measured quantity of product.

The tank also comprises a top opening 19 which is usually closed by a removable lid 20.

The tank 11 may be removed from the machine, generally by means of a forwards extraction movement, after the release of any suitable fasteners, so as to allow the cleaning and washing operations.

Figure 2:
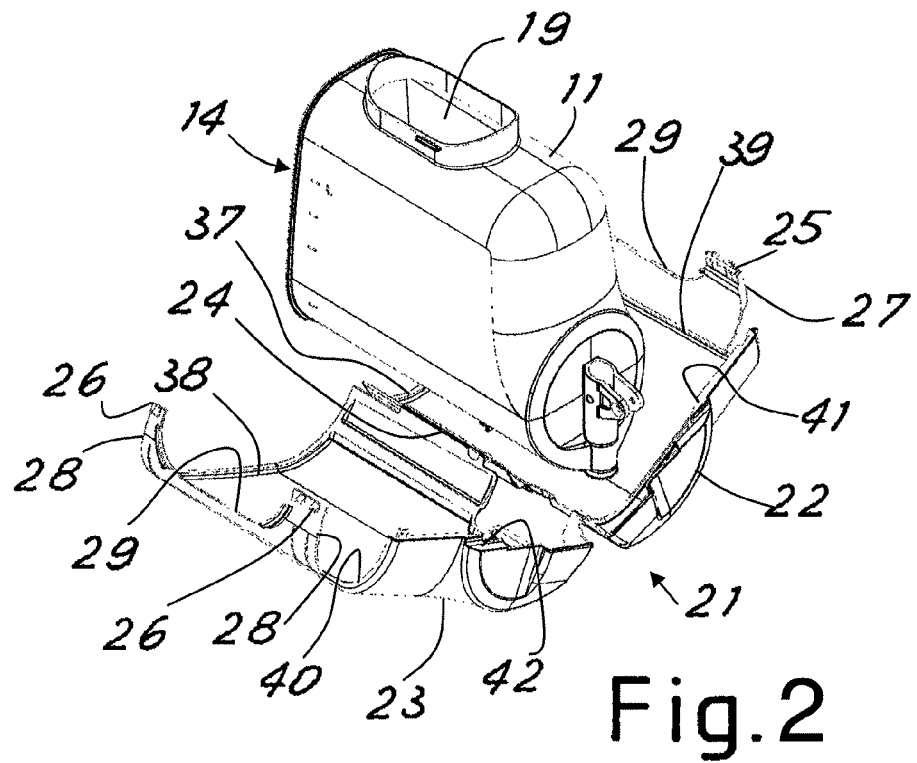
FIG. 2 shows a schematic perspective view of the tank of the machine according to FIG. 1 with an outer shell open.

As shown in FIGS. 1 and 2, a shell 21 of the opening type, advantageously also made of transparent plastic, is removably mounted on the tank 11. The shell 21 advantageously comprises two parts or half-shells 22, 23 which can be disengaged from each other so as to allow mounting on and removal from the tank.

Advantageously, these half-shells may be opened sideways, preferably by means of at least one hinge along a hinging system 24 situated underneath the tank and extending in particular with an axis of rotation which is longitudinal relative to the tank itself.

Again advantageously, the two half-shells may be provided with releasable snap-engaging means 25, 26 for closing the shell around the tank. The shell may thus be easily opened manually for mounting thereof onto the tank and for subsequent removal when required.

In the case where the shells are hinged together, the engaging means may be arranged in a position on the shell opposite to the hinge so as to complete and maintain the closure of the shells which rotate about the hinge.

Preferably, the snap-engaging means are arranged on facing tongues 27, 28 projecting towards each other on the top part of the half-shells, in a position opposite to that of the hinging system 24 situated underneath the tank and may in any case have seats 25 inside which teeth 26 may snap-engage and be engaged and disengaged owing to the elasticity of the tongues.

The tongues 27, 28 may be arranged in pairs in the vicinity of the front end and the rear end of the shell so as to leave free a central passage 29 through which the opening 19 for filling the tank is accessible or passes.

The hinging system 24 may be advantageously of the type which can be separated so as to allow total separation of the half-shells from each other. This facilitates, for example, washing of the two half-shells.

Figure 3:
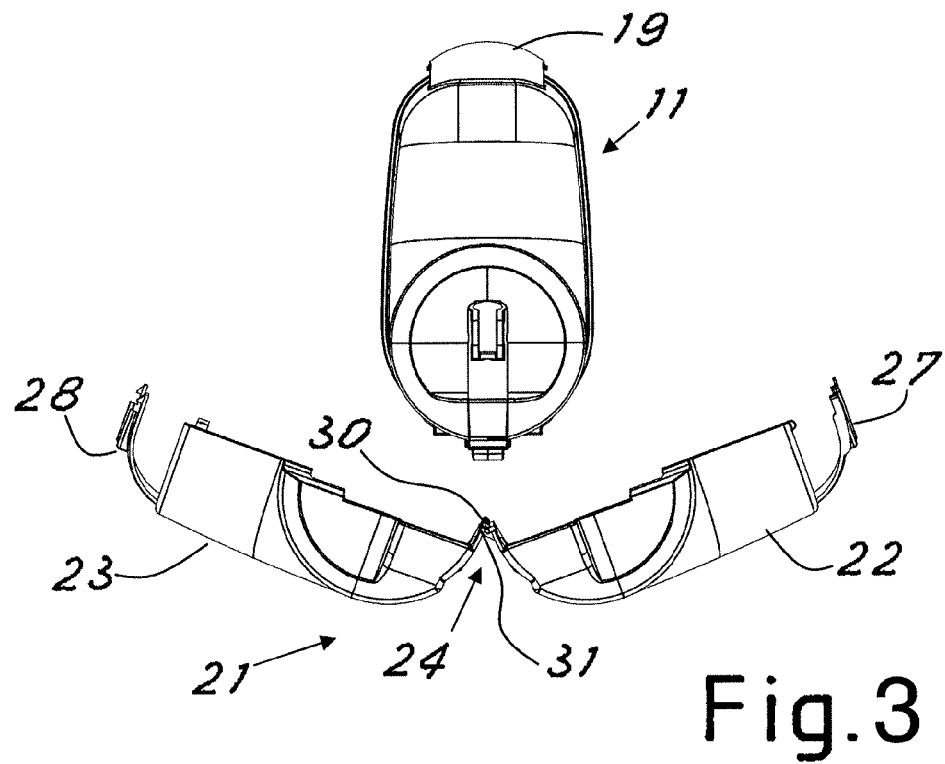
FIG. 3 shows a view similar to that of FIG. 1, but from a front position of the tank.

As can be understood from the figures, the hinging system 24 may for example be advantageously formed by a sequence of pins 30 and corresponding C-shaped fasteners 31 for allowing easy separation of the two half-shells once open in the position shown in FIG. 3.

Advantageously, the form of shell matches substantially the form of the tank, but defines suitable cavities between the outer wall of the tank and the inner wall of the shell so as to ensure the desired thermal insulation of the tank from the exterior.

Figure 4:
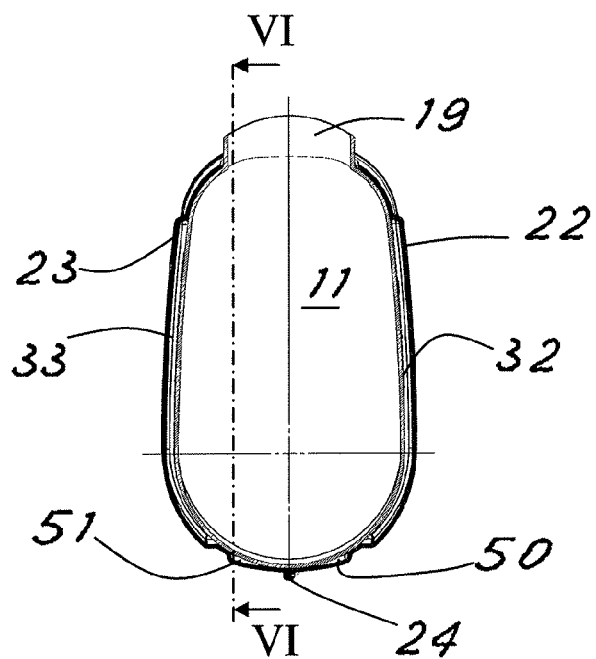
FIG. 4 shows a schematic cross-sectional view of the tank according to FIG. 1.

As can be seen in the cross-section of FIG. 4, advantageously the half-shells define at least lateral cavities 32, 33 between the side walls of the tank and the facing walls of the half-shells in order to ensure the required thermal insulation along the sides of the tank.

At least partial cavities 50, 51 may also provided close to the bottom of the tank, advantageously along the two sides of the hinging system 24. These cavities may be independent or form an extension of the lateral cavities.

Figure 5:
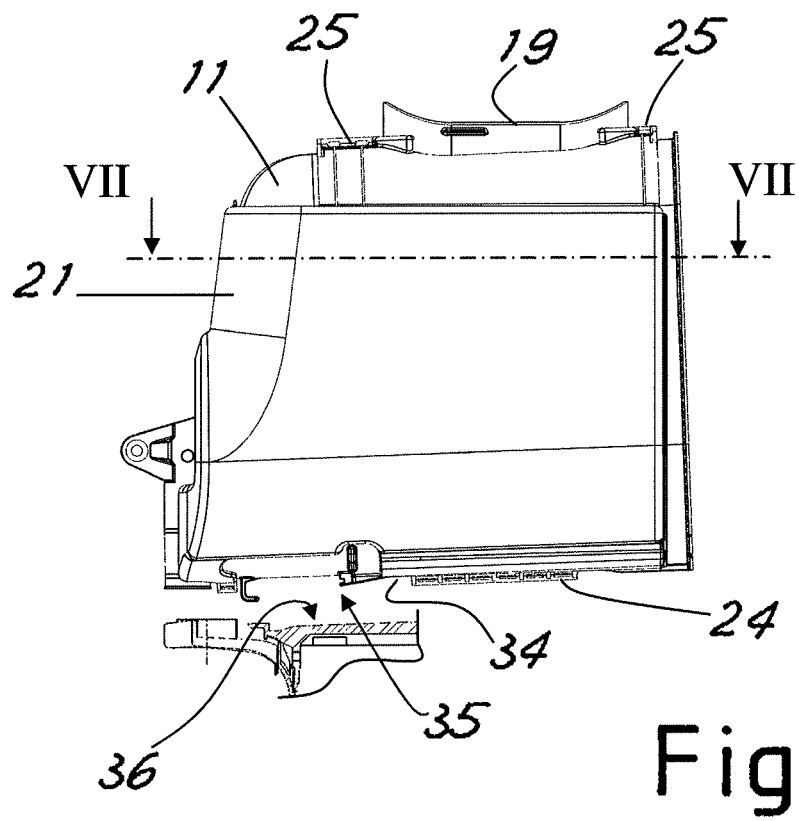
FIG. 5 shows a schematic side view of the tank according to FIG. 1 in a position slightly disengaged from the machine.
Figure 6:
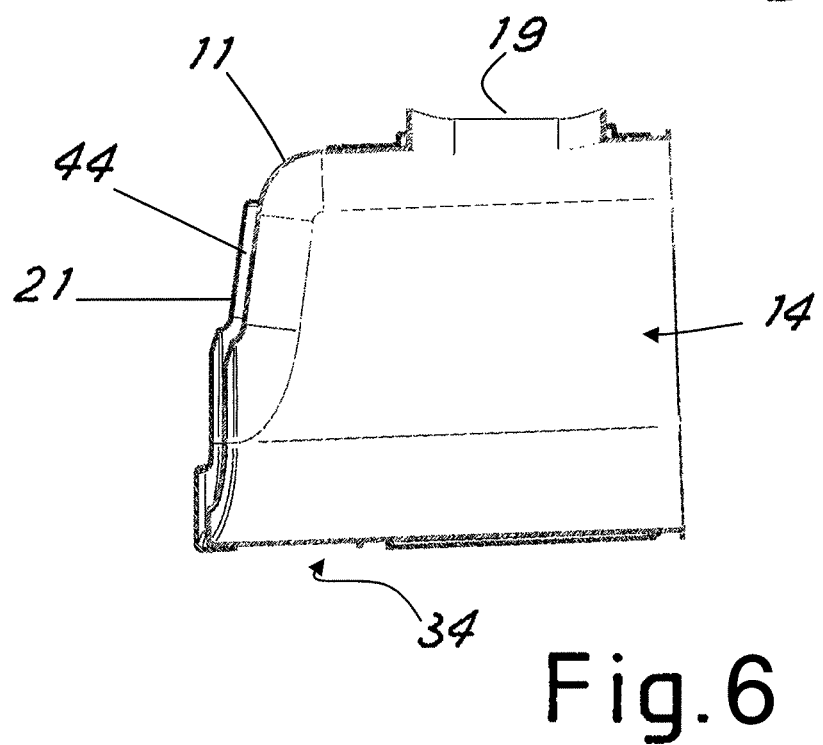
FIG. 6 shows a vertical, longitudinally sectioned, schematic view along the line VI-VI of FIG. 4.

As can be seen more clearly in FIGS. 5 and 6, at the rear the shell may terminate just before the edge of the tank, so as to allow suitable sealed engagement between the tank and the rear of the machine, as is normal for this type of machine.

The thickness with which the cavities are formed may be chosen depending on the desired thermal insulation. The shell wall may also be made of a selected material (single or multilayered) suitable also for ensuring improved thermal insulation of the tank situated behind.

At the top the tank may instead not have cavities since the chilled product does not usually reach the top of the container and, in any case, in this position a lid 20 which is sufficiently large to provide good insulating coverage may be provided (as shown in the figures).

Furthermore, by forming the top part of the shell without any cavities, the thickness added by the shell to the tank in this zone is limited to merely the thickness of any fastening tongues and the lid may also be designed with dimensions suitable also for the tank without shell.

In this way, the user of the machine may for example decide whether or not to fit the shell depending on the circumstances and on the specific needs.

For the same reason, the bottom of the half-shell may also be devoid of cavities so as to allow the tank to rest inside the seat on the machine both with or without the shell.

Moreover, at the bottom the shell may have interruptions opposite any supporting or engaging elements of the machine tank and body. For example, FIGS. 5 and 6 clearly show an interruption 34 in the shell for allowing engagement between a releasable engaging element 35 present on the bottom of the tank and a corresponding engaging seat 36 on the surface of the machine for resting and supporting the tank.

FIG. 6 also shows the front extension 44 of the cavity formed by the lateral cavities and providing improved thermal insulation at the front of the tank.

Along the respective terminal edges of the cavities, the half-shells are provided with ribs or lips (generically indicated by 37, 38, 39, 30, 41, 42 for example in FIG. 2) which are directed towards the facing corresponding surface of the tank wall so as to rest thereon and laterally close the cavity externally in order to improve the thermal insulation function thereof, forming an air cushion which is adequately insulated from the external environment. Since the shell is removable, it is not necessary for the seal to be perfect, as instead was necessary in the solutions of the prior art.

Figure 7:
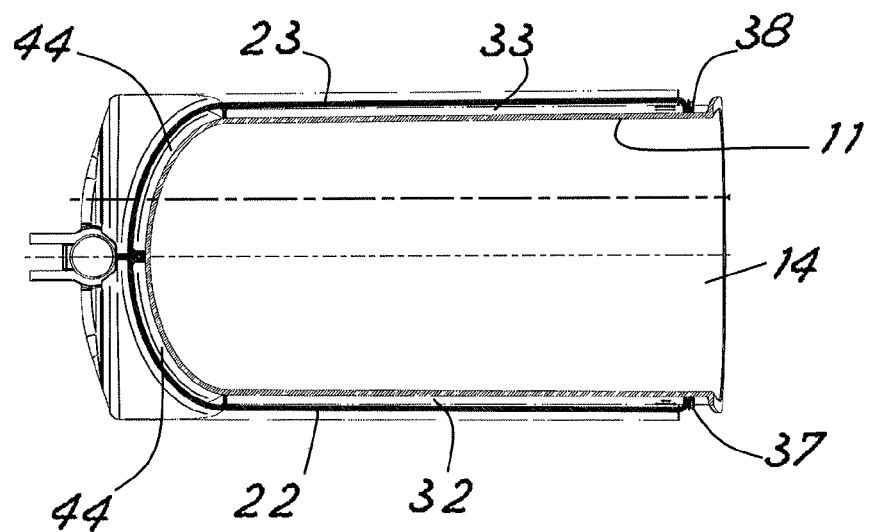
FIG. 7 shows a cross-sectional view along the line VII-VII of FIG. 5.

A possible extension and form of the cavities and closing ribs is also visible in the cross-section of FIG. 7.

The said ribs or lips of the half-shells may also be made of a material different from that of the half-shells, for example so as to obtain a greater transparency and/or rigidity of the half-shells and at the same time a greater flexibility and hydraulic sealing action at the points of contact with the tank, by forming seals with the ribs or lips.

In the front zone of the tank where the tap is present, the half-shells may terminate along the sides of the tap so as not to enclose it and not alter the functionality and appearance of this part. For example, the two half-shells may rest on the two side walls of the tap, as is clear to the person skilled in the art from FIGS. 1, 2 and 7.

Figure 8:
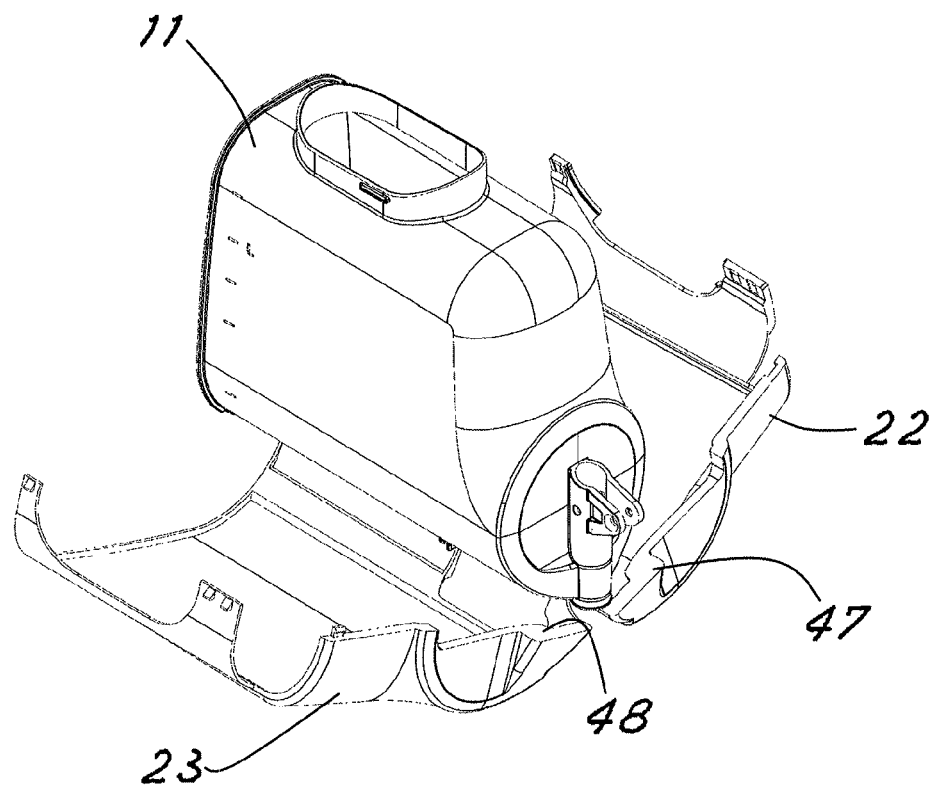
FIGS. 8 and 9 are views similar to those of FIG. 2, but of possible constructional variants of the tank according to the invention.

Alternatively, as shown in the variant of FIG. 8 (which is otherwise the same as the preceding embodiment), the two half-shells have edges in the vicinity of the tap and are provided with corresponding ribs or lips 47, 48 which are directed towards the wall of the tank so as to form a seal with it alongside the tap.

Figure 9:
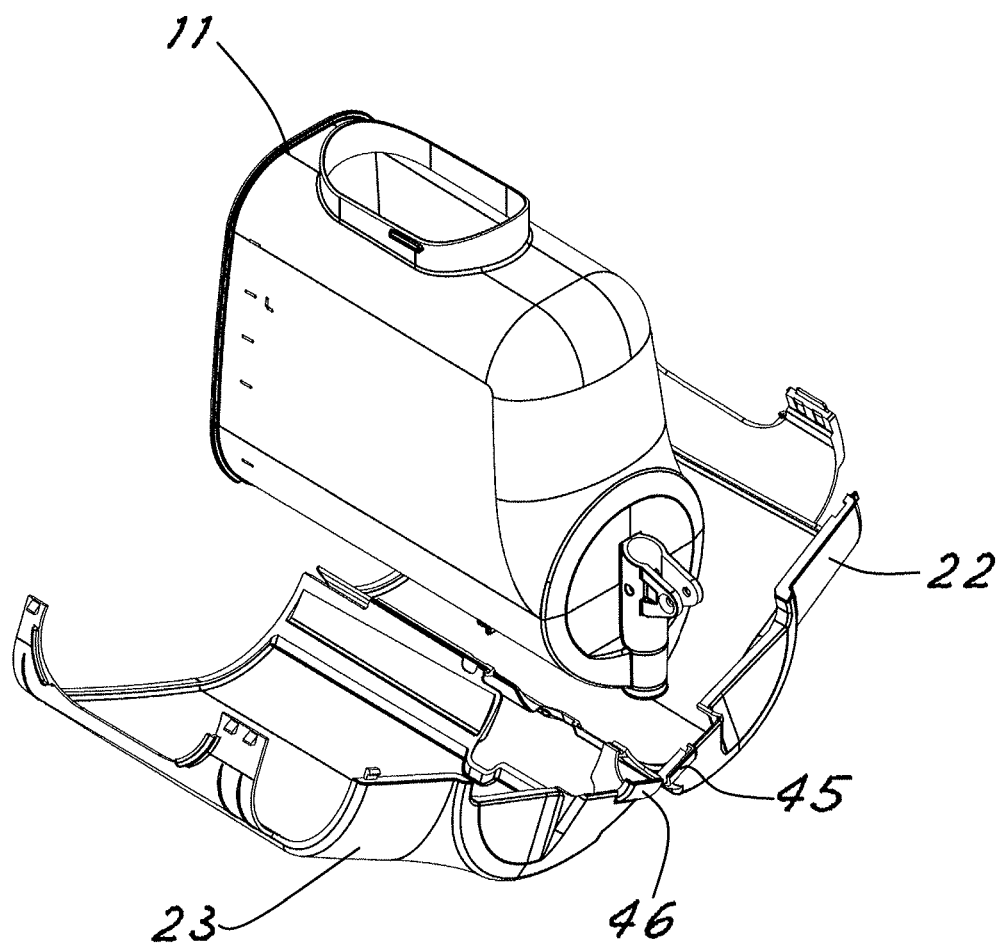

Alternatively, as shown in the variant in FIG. 9 (which is otherwise the same as the preceding embodiments), the two half-shells have edges in the vicinity of the tap which are provided with corresponding tongues 45, 46 directed towards each other and formed so as to surround in the manner of a closed shell at least one section of the tap. This section may advantageously correspond to the tap section where, when the tap is closed, the product to be dispensed is present. This may also provide improved thermal insulation along this section, without moreover requiring a cavity formed integrally with the tank.

At this point it is clear how the predefined objects have been achieved. A machine and a shell according to the invention provide improved thermal insulation without stagnation problems and cleaning difficulties since the insulation shell can be removed from the tank and cleaned separately therefrom. Moreover, the materials may be freely and differently chosen for the tank and shell so that each has its own desired characteristics (in terms of appearance, finish or surface hardness, impact resistance, transparency, etc.). Moreover, according to further characteristic features of the invention, it is also possible not to mount the shell on the tank in given conditions or for particular needs.

Obviously the description above of an embodiment applying the innovative principles of the present invention is provided by way of example of these innovative principles and must therefore not be regarded as limiting the scope of the rights claimed herein. For example, the appearance, the forms and the proportions of the machine, the tank and the shell may vary with respect to that shown by way of example. The two half-shells may also not comprise a hinging system, but only removable inter-connecting means of the type known per se. The machine may also be of the type comprising several tanks and the shell may be formed correspondingly.

The invention claimed is:

1. A machine for production and dispensing of chilled food products comprising a tank containing an evaporator of the machine and a motorized mixer which rotates coaxially with the evaporator, with evaporator and mixer projecting inside the tank through a rear sealed opening thereof, the tank being moreover provided with a top opening closed by a removable lid, a base, and at a front of the machine a tap for dispensing product through a dispensing outlet arranged above a dispensing zone to house a container for receiving the product from the tap, wherein the machine further comprises a shell that is capable of being opened and which encloses at least partially the tank laterally between the top opening and the base and which forms a covering that provides thermal insulation of the tank and external to the tank from external environment.

2. Machine according to claim 1, characterized in that in at least some zones of the shell a space is present between an inner wall of the shell and an outer wall of the tank so as to form a cavity for dictating the thermal insulation of the tank and external to the tank from the external environment.

3. Machine according to claim 2, characterized in that the cavity is situated opposite at least side walls of the tank.

4. Machine according to claim 2, characterized in that the zones and the cavity formed therefrom are positioned about sides of the tank, while a portion of the shell which is arranged on a top part of the tank is open and instead is covered by the removable lid which also closes the top opening for accessing an inside of the tank.

5. Machine according to claim 4, characterized in that the cavities are positioned on at the front of the tank.

6. Machine according to claim 1, characterized in that the shell comprises two half-shells which are joined together.

7. Machine according to claim 6, characterized in that the two half-shells are joined together by means of a hinging system situated underneath the tank and extending with an axis of rotation longitudinal relative to the tank so that the two half-shells can be opened apart from one another in a hinged manner.

8. Machine according to claim 7, characterized in that the hinging system allows total separation of the half-shells from each other.

9. Machine according to claim 6, characterized in that the half-shells comprise at least upper tongues for removable, mutual, closing engagement.

10. Machine according to claim 6, characterized in that the half-shells are interrupted in a zone of the tap.

11. Machine according to claim 1, characterized in that the shell comprises ribs which are directed towards an outer wall of the tank and which make contact with said outer wall so as to define internal closed-off lateral cavities between the shell and the tank from the external environment.

12. Machine according to claim 1, characterized in that the shell covers at least partially the tap.

13. Thermal insulation shell to cover at least partially a tank of a machine for production and dispensing of chilled food products, the machine of a type comprising a tank containing an evaporator of the machine and a motorized mixer which rotates coaxially with the evaporator, with evaporator and mixer projecting inside the tank though a rear sealed opening thereof, the tank being moreover provided with a top opening closed by a removable lid, a base, and at a front of the machine a tap for dispensing product through a dispensing outlet arranged above a dispensing zone to house a container for receiving the product from the tap, the thermal insulation shell provided with opening and closing means for mounting at least laterally about the tank between the top opening and the base.

14. Shell according to claim 13, characterized in that the shell comprises two half-shells joined together by means of the said opening and closing means.

15. Shell according to claim 14, characterized in that the opening and closing means comprise a hinging system extending with a longitudinal axis of rotation between the half-shells, and releasable engaging elements situated on parts of the half-shells opposite the hinging system.

* * * * *